(12) United States Patent
Ganesh et al.

(10) Patent No.: US 10,735,373 B2
(45) Date of Patent: Aug. 4, 2020

(54) COMMUNICATIONS OVER MULTIPLE PROTOCOL INTERFACES IN A COMPUTING ENVIRONMENT

(71) Applicant: International Business Machines Corporation, Armonk, NY (US)

(72) Inventors: Perinkulam I. Ganesh, Round Rock, TX (US); Dimpu K. Nath, Bangalore (IN); Matthew R. Ochs, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 454 days.

(21) Appl. No.: 15/150,210

(22) Filed: May 9, 2016

(65) Prior Publication Data

US 2016/0255048 A1 Sep. 1, 2016

Related U.S. Application Data

(63) Continuation of application No. 14/919,443, filed on Oct. 21, 2015, now Pat. No. 9,356,863, which is a
(Continued)

(51) Int. Cl.
*H04L 29/12* (2006.01)
*H04L 29/08* (2006.01)
(Continued)

(52) U.S. Cl.
CPC .......... *H04L 61/6086* (2013.01); *H04L 45/52* (2013.01); *H04L 45/74* (2013.01);
(Continued)

(58) Field of Classification Search
CPC ........... H04L 2012/5652; H04L 69/329; H04L 61/6086; H04L 45/52; H04L 45/74; H04L 67/42; H04L 69/22
(Continued)

(56) References Cited

U.S. PATENT DOCUMENTS 7,639,686 B2 12/2009 Wetterwald et al.
7,724,776 B2 5/2010 Julien et al.
(Continued)

OTHER PUBLICATIONS ip.com; "Runtime Local Mobility Anchor (LMA) Assignment Support for Proxy Mobile IPv6"; IPCOM000214961D; Feb. 1, 2012 (45 pages).
(Continued)

*Primary Examiner* — Ricky Q Ngo
*Assistant Examiner* — Ellen A Kirillova
(74) *Attorney, Agent, or Firm* — James L. Baudino

(57) ABSTRACT

A method and technique for communications over multiple protocol interfaces in a computing environment includes identifying a first communications protocol of a network interface for ingress data packet communications. Responsive to the identified first communications protocol of the network interface differing from a second communications protocol used for the data packet communications, fragmentation data according to a data packet fragmentation protocol corresponding to the second communications protocol is derived from an application layer header of the data packet communications. A logical packet is re-assembled from the data packet communications using the data packet fragmentation protocol and the fragmentation data.

18 Claims, 7 Drawing Sheets

Related U.S. Application Data continuation of application No. 13/769,527, filed on Feb. 18, 2013, now Pat. No. 9,197,556, which is a continuation of application No. 13/651,493, filed on Oct. 15, 2012, now Pat. No. 9,191,313.

(51) Int. Cl.
*H04L 12/781* (2013.01)
*H04L 29/06* (2006.01)
*H04L 12/741* (2013.01)
*H04L 12/70* (2013.01)

(52) U.S. Cl.
CPC .............. *H04L 67/42* (2013.01); *H04L 69/22* (2013.01); *H04L 69/329* (2013.01); *H04L 2012/5652* (2013.01)

(58) Field of Classification Search
USPC .......................................................... 370/329
See application file for complete search history.

(56) References Cited

U.S. PATENT DOCUMENTS

| | | | |
|---|---|---|---|
| 9,356,863 B2* | 5/2016 | Ganesh | ................... H04L 45/74 |
| 2001/0040895 A1 | 11/2001 | Templin | |
| 2004/0162909 A1 | 8/2004 | Choe et al. | |
| 2005/0281287 A1* | 12/2005 | Niinomi | ................... H04L 49/90 370/474 |
| 2009/0016253 A1 | 1/2009 | Lewis et al. | |
| 2009/0097486 A1 | 4/2009 | Carlini et al. | |
| 2009/0225675 A1 | 9/2009 | Baum et al. | |
| 2011/0310898 A1 | 12/2011 | Alkhatib | |
| 2012/0005372 A1 | 1/2012 | Sarikaya et al. | |
| 2012/0110210 A1 | 5/2012 | Huang et al. | |
| 2012/0117379 A1 | 5/2012 | Thornewell et al. | |
| 2012/0221928 A1 | 8/2012 | Abel et al. | |
| 2013/0103853 A1* | 4/2013 | Lyon | ................... H04L 61/6086 709/238 |

OTHER PUBLICATIONS

Garcia et al.; "The Ethernet Frame Payload Size and Its Effect on IPv4 and IPv6 Traffic", International Conference on Information Networking; Jan. 23-25, 2008 (pp. 1-5).

Postel, J.; RFC 791; Internet Protocol—DARPA Internet Program; Protocol Specification; Sep. 1981.

Postel, J.; RFC 793; Transmission Control Protocol—DARPA Internet Program; Protocol Specification; Sep. 1981.

Deering, S. et al.; RFC 2460; Internet Protocol—Version 6 (IPv6) Specification; Dec. 1998.

* cited by examiner

COMMUNICATIONS OVER MULTIPLE PROTOCOL INTERFACES IN A COMPUTING ENVIRONMENT

BACKGROUND

In a clustered or other type of computing environment, communication redundancy may be maintained at a data fragmentation level. That is, a large packet of data may be split or fragmented into suitable size packets or fragments to be communicated over a wide range of communication interfaces. The fragments are transmitted over the different communication interfaces from an originating node to a destination node. At the receiving node, the packets or fragments are re-assembled. This redundancy technique ensures that even if one interface goes down in the midst of transferring packets, the necessary packet fragments reach the destination node through other interfaces. At the destination node, a network interface device may re-assemble the packets even if the packet fragments are received from different interfaces. In a clustered or computing environment where the IP topology is heterogeneous, nodes in the environment must be aware of the different versions of IP topologies to process the fragmentation logic.

BRIEF SUMMARY

According to one aspect of the present disclosure a method and technique for communications over multiple protocol interfaces in a computing environment is disclosed. A first communications protocol of a network interface for ingress data packet communications is identified. Responsive to the identified first communications protocol of the network interface differing from a second communications protocol used for the data packet communications, fragmentation data according to a data packet fragmentation protocol corresponding to the second communications protocol is derived from an application layer header of the data packet communications. A logical packet is re-assembled from the data packet communications using the data packet fragmentation protocol and the fragmentation data.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
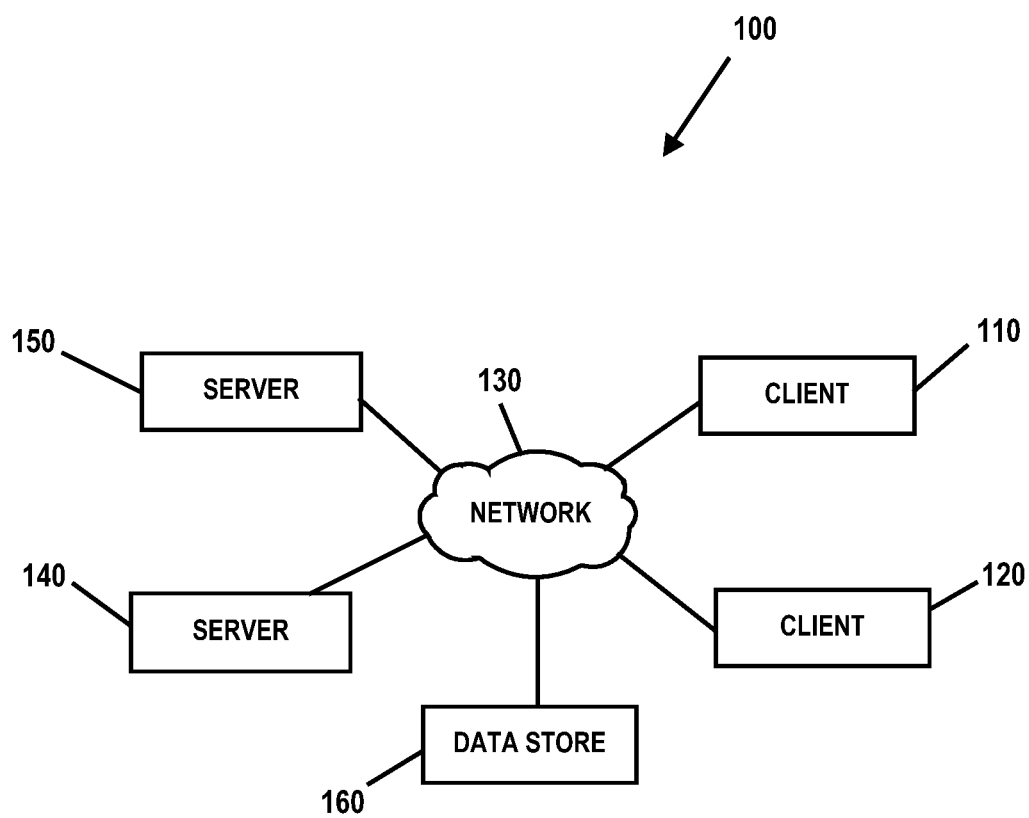
FIG. 1 is an embodiment of a network of data processing systems in which the illustrative embodiments of the present disclosure may be implemented.

Embodiments of the present disclosure provide a method, system and computer program product for communications over multiple protocol interfaces in a computing environment. For example, in some embodiments, the method and technique includes: identifying a network interface for egress data packet communications; responsive to the identified network interface differing from a data packet fragmentation technique desired for the data packet communications, deriving fragmentation data according to the desired data packet fragmentation technique; generating an application layer header for the data packet communications; storing values of the fragmentation data in select fields of the application layer header; fragmenting the data packet communications according to the desired data packet fragmentation protocol; and transmitting the data packet communications including the application layer header over the identified network interface. Thus, embodiments of the present disclosure enable a desired data packet fragmentation technique (e.g., IPv4) to be applied to traffic over a different, incompatible interface (e.g., IPv6) by including certain fragmentation information in an application layer header, thereby enabling re-assembly of the logical packet even though the packet was communicated using a protocol unsupported by the communication interface. Thus, by utilizing information extracted from certain header fields corresponding to a particular network interface protocol and storing those values in an application layer header used in communications over an incompatible interface, compatibility between the different interfaces is obtained such that fragments of a greater logical packet can be interchanged (e.g., for re-assembly) regardless of the interface used for transmission/receipt.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
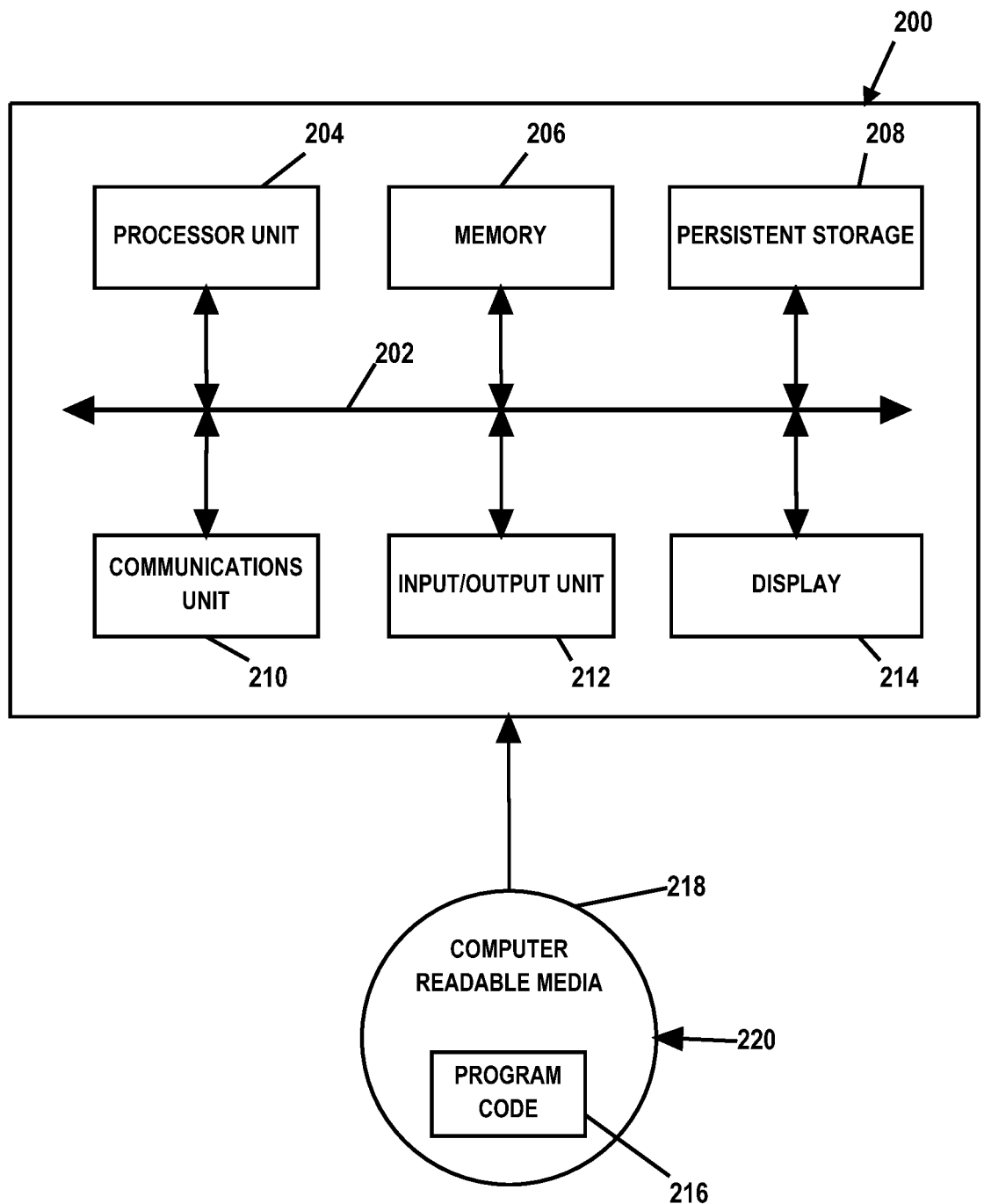
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for supporting communications over incompatible protocol interfaces according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
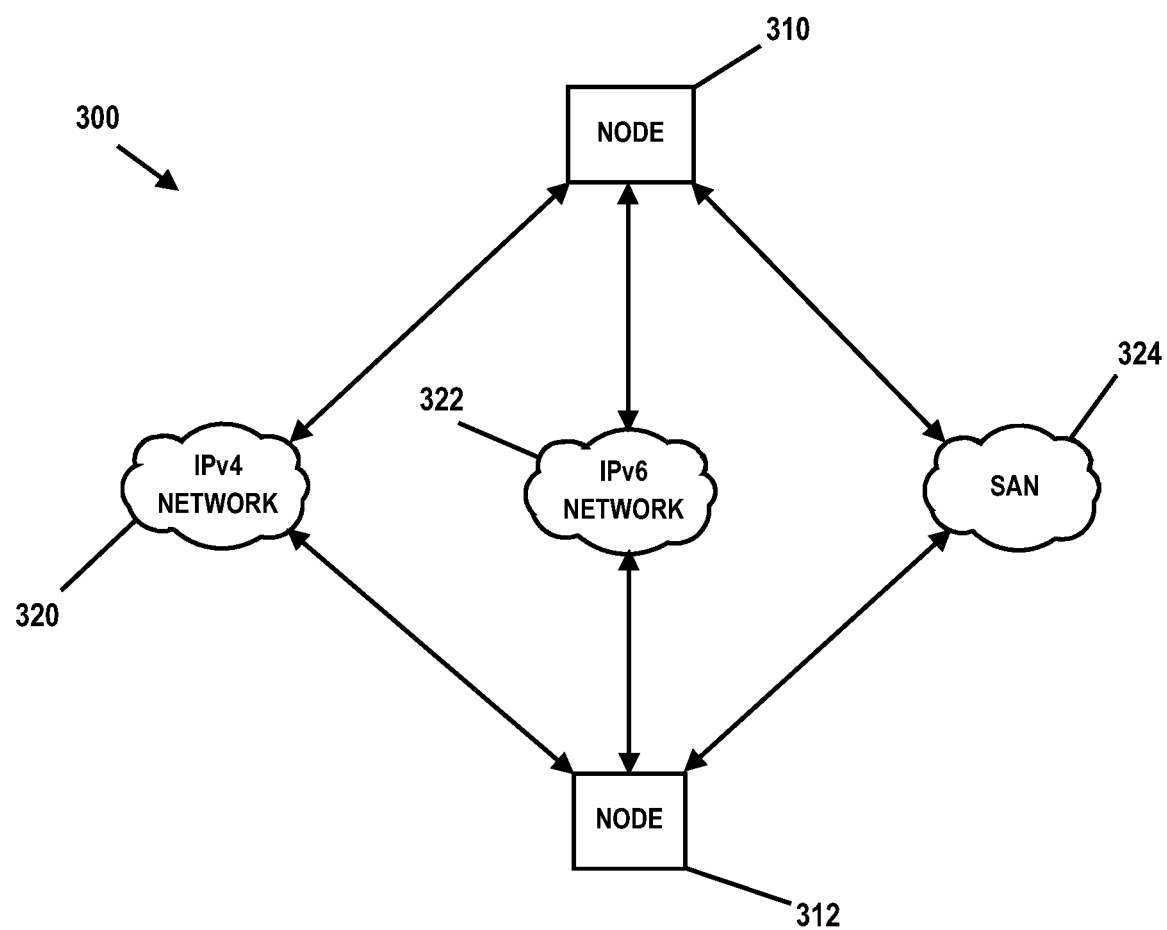
FIG. 3 is a diagram illustrating an embodiment of a computing environment in which illustrative embodiments of the present disclosure may be implemented.

FIG. 3 is a diagram illustrating a clustered network environment 300 in which an embodiment of a system for supporting communications over multiple protocol interfaces according to the present disclosure may be implemented. In the illustrated embodiment, environment 300 includes nodes 310 and 312 connectable to each other via a number of different types of communication network interfaces 314. In the illustrated embodiment, two nodes 310 and 312 are illustrated; however, it should be understood that the quantity and interface connections between the various nodes of the clustered environment may vary. Any number of communication network topologies may be used for communication network interfaces 314. For example, a widely known protocol of a network layer for the Transmission Control Protocol/Internet Protocol is an Internet Protocol. In the illustrated embodiment, interfaces include an IPv4 (Internet Protocol version 4) network 320, an IPv6 (Internet Protocol version 6) network 322 and a storage area network (SAN) 324; however, it should be understood that other types of communication interfaces may be used. Nodes 310 and 312 may be physically located in close proximity to each other or remotely located.

In a clustered or other type of environment, communication redundancy may be maintained at a data fragmentation level. That is, a large packet of data may be split or fragmented into suitable size packets or fragments to be communicated over a wide range of communication interfaces. The fragments are transmitted over the different communication interfaces from an originating node (e.g., node 310) to a destination node (e.g., node 312). At the receiving node, the packets or fragments are re-assembled. In some instances, the fragments may arrive in random order. This redundancy technique ensures that even if one interface goes down in the midst of transferring packets, the necessary packet fragments reach the destination node through other interfaces. At the destination node, a network interface device may re-assemble the packets even if the packet fragments are received from different interfaces. However, in a clustered environment where the IP topology is heterogeneous, such as environment 300, nodes in the environment must be aware of the different versions of IP topologies to process the fragmentation logic.

Figure 4:
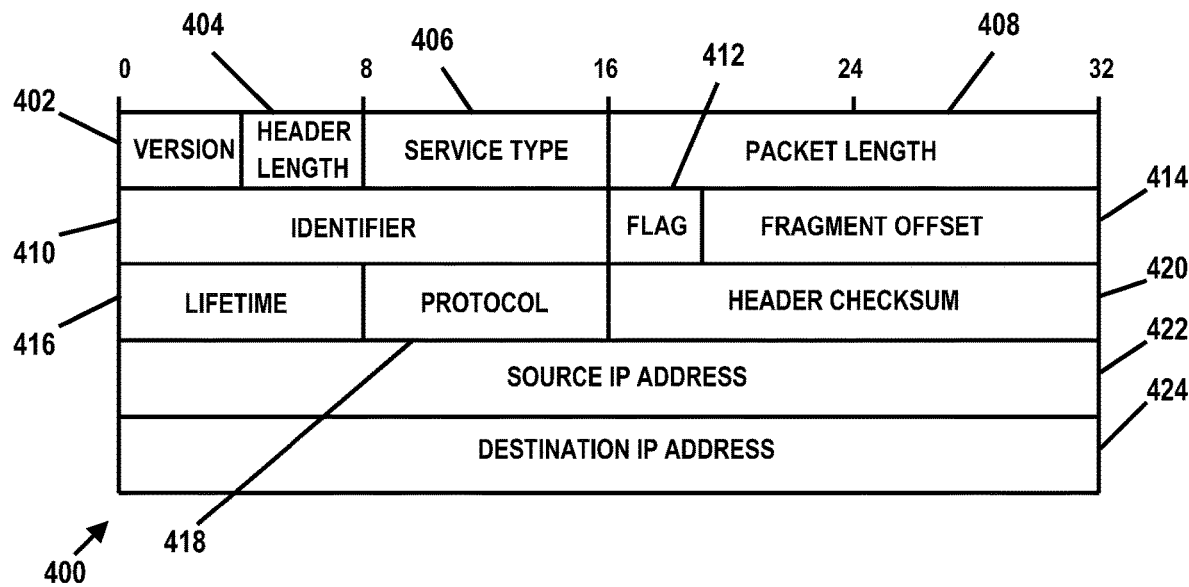
FIG. 4 is a diagram illustrating a datagram for an IPv4 Internet Protocol header.

FIG. 4 is a diagram illustrating the structure of an IPv4 header 400 datagram format. As illustrated in FIG. 4, IPv4 header 400 includes a number of different fields of varying bit length relaying various types of information corresponding to the data packet. For example, header 400 includes a field 402 containing a version number of the protocol (e.g., "4"), a field 404 containing a length of the header 400 itself, and a field 406 comprising information indicating the service quality of communications processing. A field 408 indicates a size of the packet, a field 410 includes an identifier or unique number used to identify the frame and any associated fragments for reassembly, and a field 412 containing flags that specify the function of the frame in terms of whether fragmentation has been employed, additional fragments are coming, or this is the final fragment. A field 414 identifies the fragment offset (i.e., information indicating where the divided data (i.e., the fragments) have been positioned within the original data (e.g., the position of a particular fragment's data in relation to the first byte of data)), a field 416 indicating a time during which the packet may exist on the network, a field 418 indicating which upper-layer protocol receives incoming packets after IP processing, a field 420 containing a checksum of the IP header, a field 422 specifying the sending node, and a field 424 specifying the receiving node.

In a heterogeneous network topology, however, the fragmentation scheme or technique for one interface may be unsupported by or incompatible with a different interface. For example, the fragmentation technique used in the IPv4 protocol is unsupported by or incompatible with the IPv6 protocol interfaces. Embodiments of the present disclosure enable a single data fragmentation technique to be utilized across different network protocols. In the description herein, an exemplary embodiment of the present disclosure as applied to the IPv4 and IPv6 protocols is provided; however, it should be understood that embodiments of the present disclosure may be used with other types of dissimilar or incompatible network interfaces.

Figure 5:
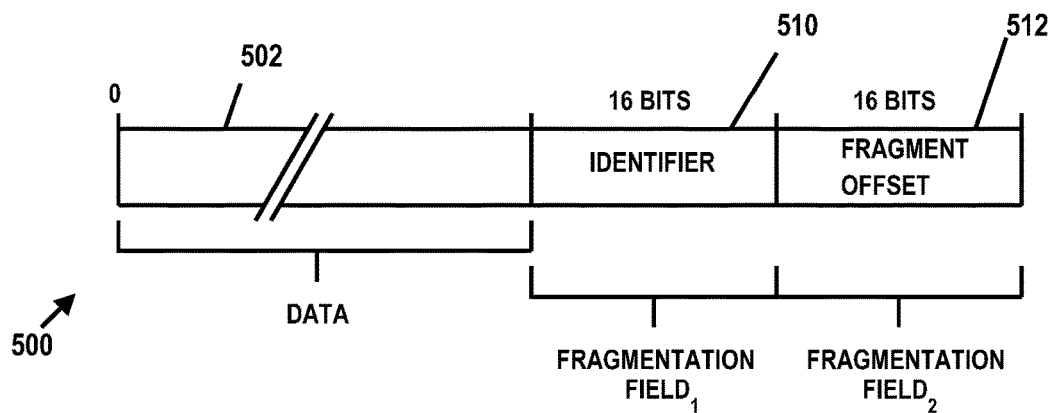
FIG. 5 is a diagram illustrating an embodiment of an application layer header according to the present disclosure.

FIG. 5 is a diagram illustrating an embodiment of an application layer header 500 of a TCP/IP protocol. In a clustered environment, such as environment 300, header 500 may be referenced as a cluster header or other designation containing protocols and/or other types of information for process-to-process communications between clustered nodes. In the illustrated embodiment, header 500 includes a base portion 502 including one or more fields that may be application-specific along with fragmentation fields 510 and 512 containing information corresponding to a particular data fragmentation technique. For example, in the illustrated embodiment, an IPv4 fragmentation technique is employed for communications across an IPv6 network interface. However, because various aspects of the IPv4 fragmentation algorithm are incompatible with the IPv6 protocol interfaces, certain types of information associated with the IPv4 protocol are included in the application layer header 500 to enable data packets transmitted over and received from an IPv6 interface to be fragmented and re-assembled based on the IPv4 protocol. Thus, for example, in the illustrated embodiment, fields 510 and 512 comprise information corresponding to the fields 410 and 414 of the IPv4 datagram header, respectively (i.e., the identifier or unique number used to identify the fragments of a logical packet, and the fragment offset or position within the logical packet). In this embodiment, fields 510 and 512 each comprise 16-bit fields, respectively, that may be extensions of an existing header or may comprise reserved or previously unused fields of an existing header. It should be understood that the size of fields 510 and/or 512 may be varied. Further, the quantity of fields and types of information included in the respective fields may vary based on the particular protocol fragmentation information needed. Additionally, it should be understood that location of fields 510 and 512 within header 500 may vary.

In some embodiments of the present disclosure, a common maximum transmission unit (MTU) size of data packets compatible with both the desired interfaces and satisfying the least minimum data size requirements needed to participate across the desired interfaces is selected for data fragmentation. The desired fragmentation technique (e.g., IPv4) is applied to traffic of a different, incompatible interface (e.g., IPv6) by utilizing fields 510 and 512 introduced in the application layer header 500. Thus, by utilizing information extracted from fields 510 and 512 of application layer header 500, compatibility between the different interfaces is obtained such that fragments of a greater logical packet can be interchanged (e.g., for re-assembly) regardless of the interface used for transmission/receipt. Accordingly, embodiments of the present disclosure enable a simplified cluster communications software stack as only one fragmentation algorithm/technique needs to be used and maintained.

Figure 6:
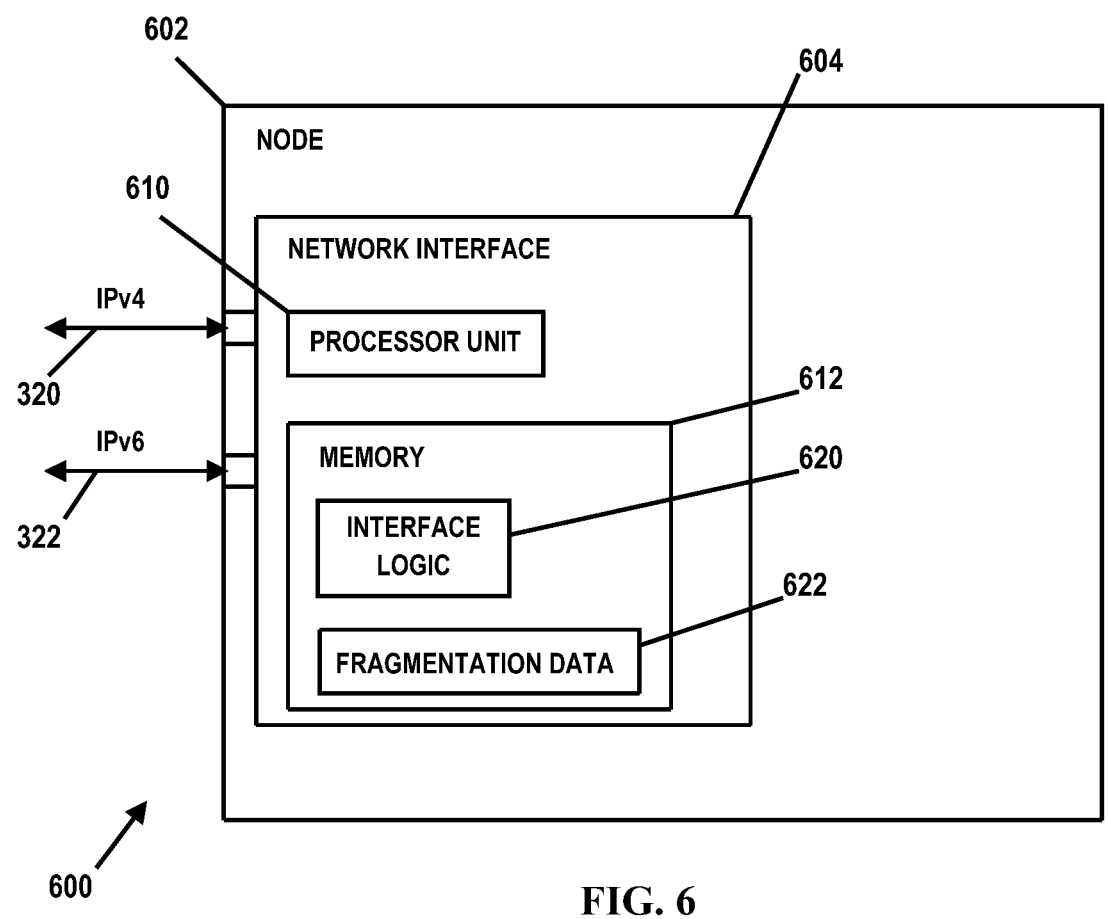
FIG. 6 is a diagram illustrating a data processing system configured for communications over multiple network interfaces according to the present disclosure.

FIG. 6 is an illustrative embodiment of a system 600 for supporting multiple Internet protocol interfaces. System 600 may be implemented on data processing systems or platforms such as, but not limited to, servers 140 and/or 150, clients 110 and/or 120, or at other data processing system locations. For example, in the embodiment illustrated in FIG. 6, system 600 comprises a data processing node 602 (e.g., servers 140 and/or 150, clients 110 and/or 120, and/or other types of data processing systems) having a network interface 604. Network interface 604 may comprise a network interface card or other type of device for transmitting/receiving communications relative to a network interface. In the illustrated embodiment, network interface 604 includes an processor unit 610 and a memory 612. In FIG. 6, memory 612 includes interface logic 620 and fragmentation data 622. Fragmentation data 622 may comprise information associated with a particular data fragmentation technique that is extracted from and/or embedded in application layer header 500 to facilitate fragmentation and re-assembly across incompatible network interfaces. For example, in the context of an IPv4 fragmentation technique to be used across an IPv6 interface, fragmentation data 622 may include information gathered during logical packet fragmentation corresponding to fields 410 and 414 that are thereafter inserted into fields 510 and 512 of an application layer header 500 for the logical packet fragment. Fragmentation data 622 may also include information corresponding to a common MTU that satisfies the minimum fragment size requirements for the desired network interfaces.

Interface logic 620 may be implemented in any suitable manner using known techniques that may be hardware-based, software-based, or some combination of both. For example, interface logic 620 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Interface logic 620 is used to store values corresponding to fields 410 and 414 into fields 510 and 512, respectively, of application layer header 500 for egress communications on an IPv6 interface. Interface logic 620 also continues to write the values from fields 410 and 414 into their respective positions in the IPv4 header for communications transmitted over IPv4 interfaces. Interface logic 620 is also used for ingress communications such that, for communications received over an IPv6 interface, interface logic 620 extracts the values from fields 510 and 512 of application layer header 500 to facilitate re-assembly of the logical data packet according to the IPv4 fragmentation/re-assembly technique. Similarly, interface logic 620 derives the values from fields 410 and 414 (as well as other header information from header 400) for re-assembly of logical packets received over an IPv4 interface. Interface logic 620 is also configured to fragment the logical packet using a common MTU that satisfies the least minimum packet size corresponding to the desired network interfaces (e.g., a common MTU to be used for both IPv4 and IPv6 interfaces).

Figure 7:
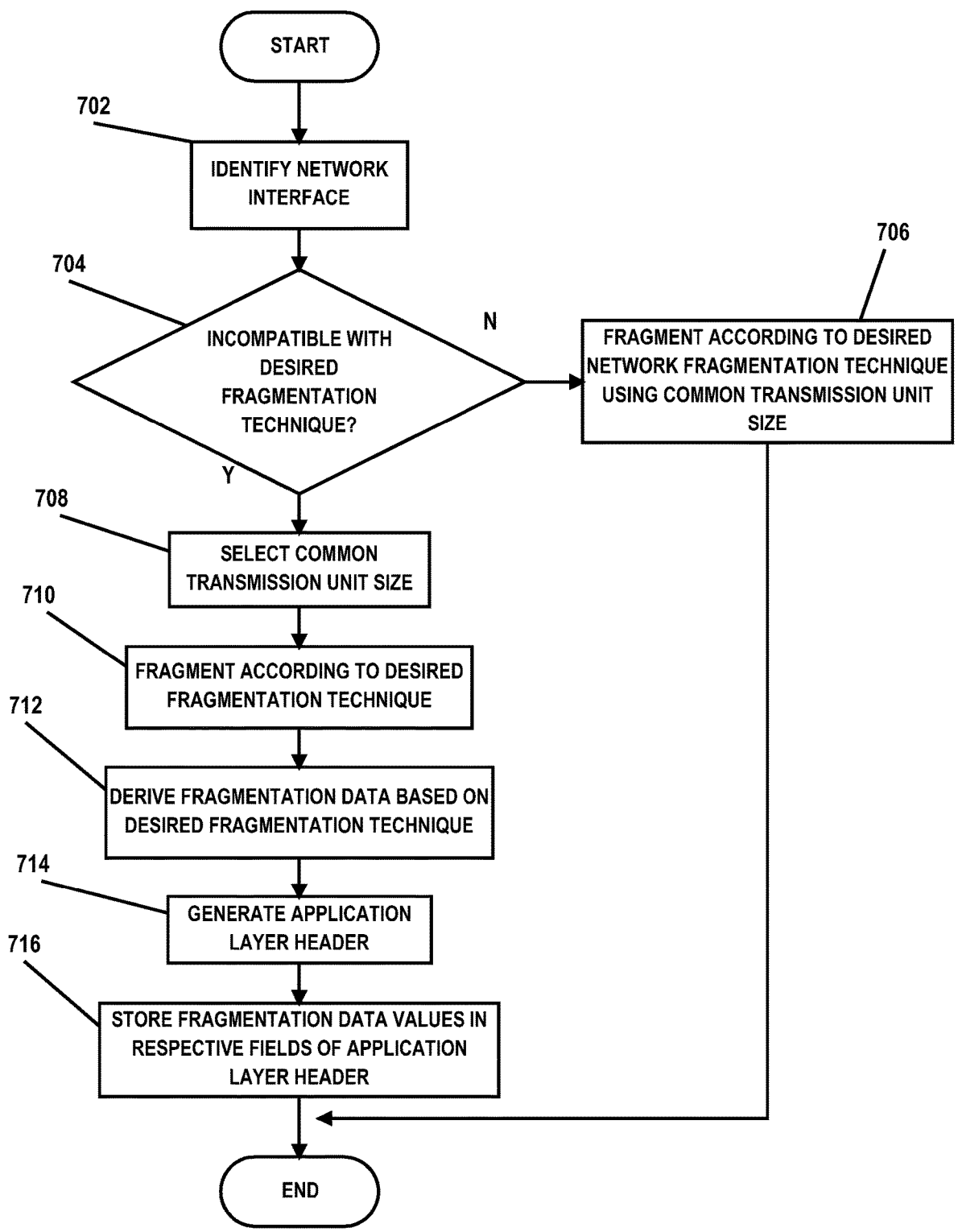
FIG. 7 is a flow diagram illustrating an embodiment of a method for communications over multiple protocol interfaces in a computing environment according to the present disclosure.

FIG. 7 is a flow diagram illustrating an embodiment of a method for supporting communications over multiple protocol interfaces in a computing environment. The method begins at block 702, where a network interface for egress communication of data packets is identified. At decisional block 704, a determination is made whether the identified interface is incompatible with the fragmentation technique being utilized. For example, if an IPv4 fragmentation technique is being utilized and the identified interface is an IPv6 interface, a determination is made that the protocols for the respective interfaces are different and/or incompatible. If at decisional block 704 it is determined that the identified interface is compatible with the fragmentation technique being utilized (e.g., an IPv4 interface using an IPv4 fragmentation technique), the method proceeds to block 706, where the logical packet is fragmented according to the desired fragmentation technique using a common MTU size based on the different network interfaces being utilized. If at decisional block 704 it is determined that the identified interface is incompatible with the fragmentation technique being utilized, the method proceeds to block 708, where the a common MTU size based on the different network interfaces being utilized is selected/identified. At block 710, the logical packet is fragmented according to the desired fragmentation technique (e.g., IPv4). At block 712, fragmentation data is derived based on the desired fragmentation technique. For example, using an IPv4 fragmentation technique for communications over an IPv6 interface, values corresponding to what would be fields 410 and 414 of a corresponding IPv4 header 400 for the packet would be derived. At block 714, application layer header 500 is generated. At block 716, the fragmentation data derived at block 712 is inserted to respective fields of application layer header 500 (e.g., in an IPv4 fragmentation technique for communicating over an IPv6 interface, values corresponding to fields 410 and 414 of the IPv4 header would be stored as the values in fields 510 and 512 of application layer header 500). In the above-described method, it should be understood that in some embodiments, the process performed at block 704 may be omitted. For example, in some embodiments, based on the identified type of interface or the particular type of interface being used for transmitting the logical packet, the method may proceed directly to block 706 or 708 depending on the interface being used for egress communications.

Figure 8:
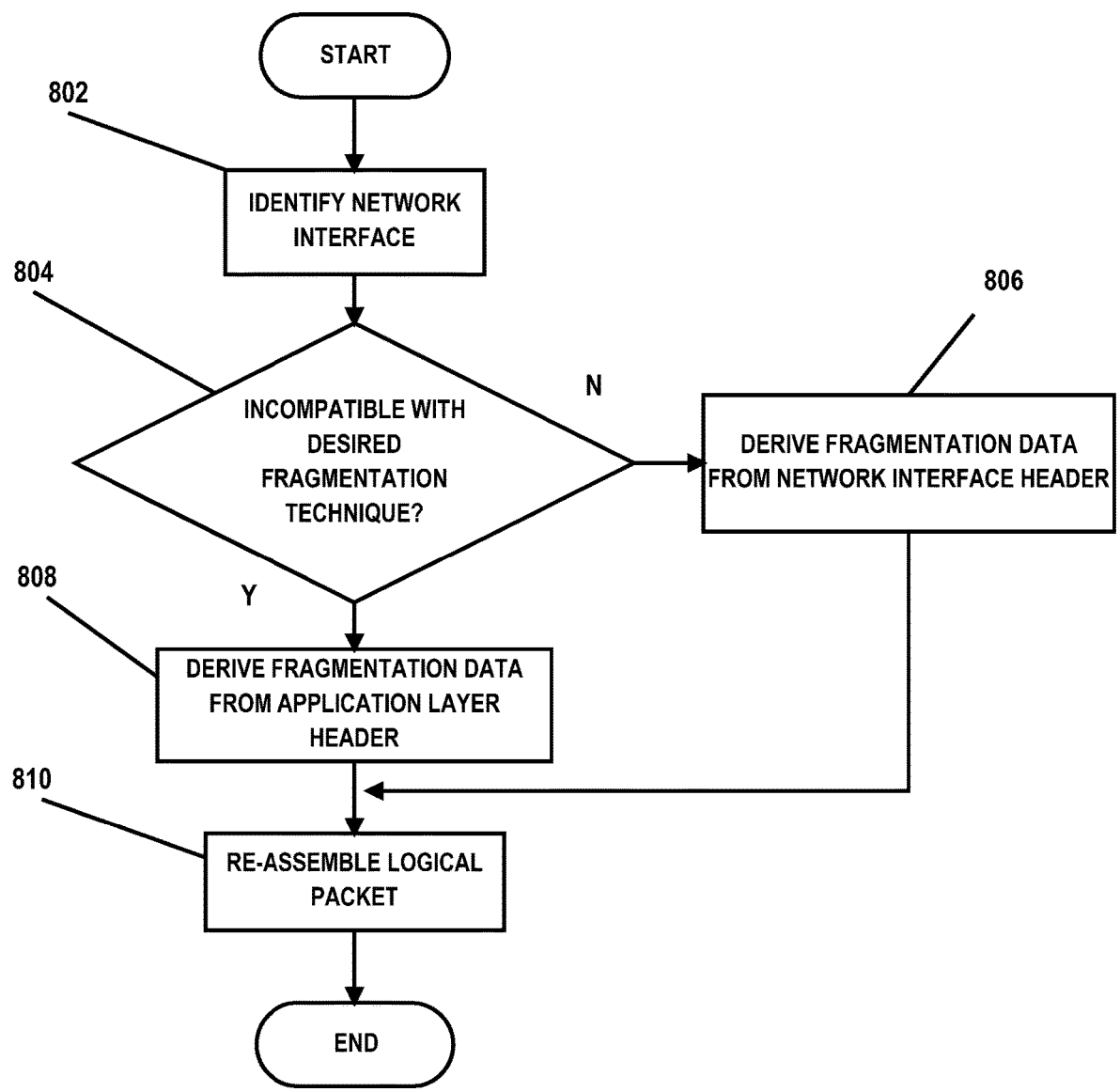
FIG. 8 is a flow diagram illustrating another embodiment of a method for communications over multiple protocol interfaces in a computing environment according to the present disclosure.

FIG. 8 is a flow diagram illustrating an embodiment of a method for supporting communications over multiple protocol interfaces in a computing environment. The method begins at block 802, where a network interface for ingress of communication data packets is identified. At decisional block 804, a determination is made whether the identified interface is incompatible with the fragmentation technique being utilized. For example, if an IPv4 fragmentation technique is being utilized and the identified interface is an IPv6 interface, a determination is made that the protocols for the respective interfaces are different and/or incompatible. If at decisional block 804 it is determined that the identified interface is compatible with the fragmentation technique being utilized (e.g., an IPv4 interface using an IPv4 fragmentation technique), the method proceeds to block 806, where the logical packet is re-assembled normally (e.g., fragmentation data for a packet fragmented using the IPv4 technique is derived from the IPv4 header and re-assembled according to the IPv4 protocol). If at decisional block 804 it is determined that the identified interface is incompatible with the fragmentation technique being utilized, the method proceeds to block 808, where fragmentation data is derived from the application layer header 500 (e.g., derived from fields 510 and 512). At block 810, the logical packet is re-assembled using the derived fragmentation data. In the above-described method, it should be understood that in some embodiments, the process performed at block 804 may be omitted. For example, in some embodiments, based on the identified type of interface or the particular type of interface receiving data communications, the method may proceed directly to block 806 or 808 depending on the interface being used for ingress communications.

Thus, embodiments of the present disclosure enable a desired data packet fragmentation technique (e.g., IPv4) to be applied to traffic over a different, incompatible interface (e.g., IPv6) by including certain fragmentation information in an application layer header, thereby enabling re-assembly of the logical packet even though the packet was communicated using a protocol unsupported by the communication interface. Thus, by utilizing information extracted from certain header fields corresponding to a particular network interface protocol and storing those values in an application layer header used in communications over an incompatible interface, compatibility between the different interfaces is obtained such that fragments of a greater logical packet can be interchanged (e.g., for re-assembly) regardless of the interface used for transmission/receipt. Accordingly, embodiments of the present disclosure enable a simplified cluster communications software stack as only one fragmentation algorithm/technique needs to be used and maintained.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   identify a first communications protocol of a network interface for ingress data packet communications received by the network interface;
   responsive to the identified first communications protocol of the network interface differing from a second communications protocol used for fragmenting the received ingress data packet communications, derive fragmentation data according to a data packet fragmentation protocol corresponding to the second communications protocol from an application layer header of the data packet communications; and
   re-assemble a logical packet from the data packet communications using the data packet fragmentation protocol and the fragmentation data.

2. The method of claim 1, wherein deriving the fragmentation data comprises deriving an identifier value.

3. The method of claim 1, wherein deriving the fragmentation data comprises deriving a fragment offset value.

4. The method of claim 1, wherein deriving the fragmentation data comprises:
   deriving an identifier value; and
   deriving a fragment offset value.

5. The method of claim 1, wherein the first communications protocol is an IPv6 protocol, and the second communications protocol is an IPv4 protocol.

6. A system, comprising:
   a processor; and
   a memory storing interface logic executable by the processor to:
      identify a first communications protocol of a network interface for ingress data packet communications received by the network interface;
      responsive to the identified first communications protocol of the network interface differing from a second communications protocol used for fragmenting the received ingress data packet communications, derive fragmentation data according to a data packet fragmentation protocol corresponding to the second communications protocol from an application layer header of the data packet communications; and
      re-assemble a logical packet from the data packet communications using the data packet fragmentation protocol and the fragmentation data.

7. The system of claim 6, wherein the logic is executable to derive the fragmentation data to include an identifier value.

8. The system of claim 6, wherein the logic is executable to derive the fragmentation data to include a fragment offset value.

9. The system of claim 6, wherein the logic is executable to derive the fragmentation data to include an identifier value and a fragment offset value.

10. The system of claim 6, wherein the first communications protocol is an IPv6 protocol, and the second communications protocol is an IPv4 protocol.

11. A computer program product for communications over multiple protocol interfaces in a computing environment, the computer program product comprising:
    a non-transitory computer readable medium having computer readable program code embodied therewith, the computer readable program code comprising computer readable program code configured to:
       identify a first communications protocol of a network interface for ingress data packet communications received by the network interface;
       responsive to the identified first communications protocol of the network interface differing from a second communications protocol used for fragmenting the received ingress data packet communications, derive fragmentation data according to a data packet fragmentation protocol corresponding to the second communications protocol from an application layer header of the data packet communications; and
       re-assemble a logical packet from the data packet communications using the data packet fragmentation protocol and the fragmentation data.

12. The computer program product of claim 11, wherein the computer readable program code is configured to derive the fragmentation data to include an identifier value.

13. The computer program product of claim 11, wherein the computer readable program code is configured to derive the fragmentation data to include a fragment offset value.

14. The computer program product of claim 11, wherein the computer readable program code is configured to derive the fragmentation data to include an identifier value and a fragment offset value.

15. The computer program product of claim 11, wherein the first communications protocol is an IPv6 protocol, and the second communications protocol is an IPv4 protocol.

16. The method of claim 1, further comprising determining that the second communications protocol for fragmenting the received ingress data packet communications is unsupported by the network interface.

17. The system of claim 6, wherein the logic is executable to determine that the second communications protocol for fragmenting the received ingress data packet communications is unsupported by the network interface.

18. The computer program product of claim 11, wherein the computer readable program code is configured to determine that the second communications protocol for fragmenting the received ingress data packet communications is unsupported by the network interface.

* * * * *